United States Patent [19]

Yamazaki

[11] Patent Number: 4,688,179
[45] Date of Patent: Aug. 18, 1987

[54] TRACER CONTROL SYSTEM

[75] Inventor: Etuo Yamazaki, Hachioji, Japan

[73] Assignee: Fanuc Ltd., Yamanashi, Japan

[21] Appl. No.: 734,262

[22] PCT Filed: Sep. 13, 1984

[86] PCT No.: PCT/JP84/00443
§ 371 Date: May 8, 1985
§ 102(e) Date: May 8, 1985

[87] PCT Pub. No.: WO85/01234
PCT Pub. Date: Mar. 28, 1985

[30] Foreign Application Priority Data

Sep. 14, 1983 [JP] Japan ................. 58-170302

[51] Int. Cl.⁴ .............. G06F 15/46; G05B 19/18
[52] U.S. Cl. ................... 364/474; 318/571; 318/578
[58] Field of Search ........ 364/474, 475, 520, 167–171; 318/571, 578, 579

[56] References Cited

U.S. PATENT DOCUMENTS

| 4,355,362 | 10/1982 | Imazeki et al. | 318/579 |
| 4,370,722 | 1/1983 | Imazeki et al. | 318/578 |
| 4,456,864 | 6/1984 | Imazeki et al. | 318/578 |
| 4,535,408 | 8/1985 | Kishi et al. | 318/579 X |
| 4,599,022 | 7/1986 | yamazaki | 318/578 X |

FOREIGN PATENT DOCUMENTS 55-11741 1/1980 Japan .
58-71047 4/1983 Japan .

Primary Examiner—Joseph Ruggiero
Attorney, Agent, or Firm—Staas & Halsey

[57] ABSTRACT

Cutting time and wear of the cutter is reduced for copy-cutting of a workpiece by tracing a concavity of a model with a stylus. The clamp level is changed in sequence and, at each clamp level, contour tracing along the entire circumference of the inner wall of the concavity of the model, and X-Y plane tracing for cutting the part above the clamp level that is left uncut by the contour tracing, are carried out.

2 Claims, 4 Drawing Figures

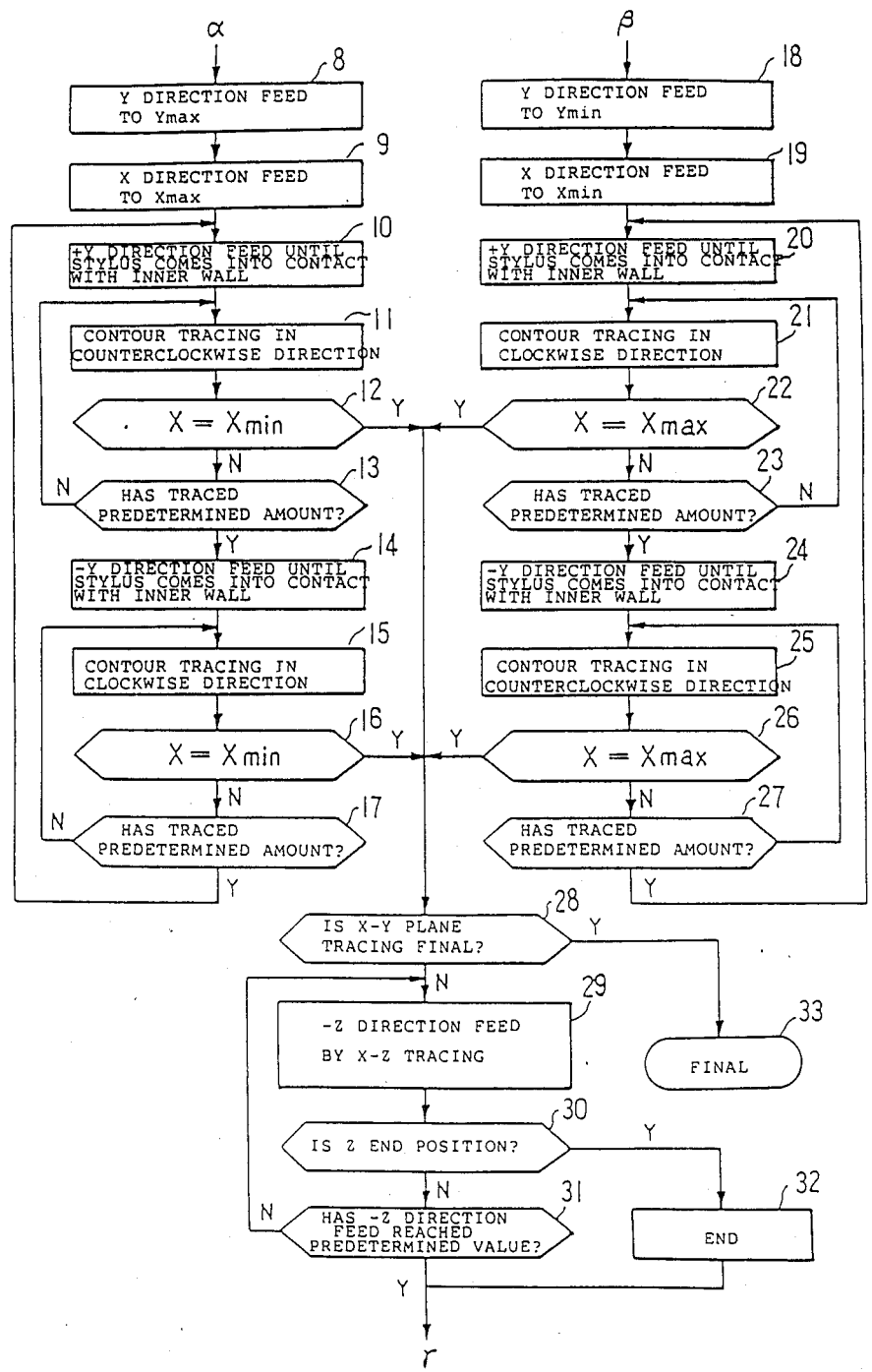

TRACER CONTROL SYSTEM

BACKGROUND OF THE INVENTION

The present invention relates to a tracer control system, and more particularly to a tracer control system which is suitable for tracing a concavity of a model.

A tracer control system is well known as a control system which traces the surface of a model with a tracer head and, while doing so, controls the position of a tool such as a cutter or the like in accordance with a displacement signal from the tracer head, thereby cutting a workpiece into the same shape as that of the model.

Conventionally known as methods for tracing a concavity of a model are clamped tracer control systems disclosed in Pat. Applns. Nos. 10228/79 and 145330/81 filed by the present applicant. The clamped tracer control system moves the tip of the tracer head (a stylus) in a predetermined direction while holding (clamping) it at a predetermined depth from the top surface of a model along the inner wall of its concavity (that is, while holding the tip of the tracer head apart from the bottom of the concavity). When the tip of the tracer head moves into contact with the inner wall of the concavity again on the opposite side thereof, it is brought up to the top surface of the model along the inner wall, and then repeats this operation over the entire area of the concavity while effecting a pick feed on the top surface of the model for each stroke while holding the tip of the tracer head at the abovesaid depth (a clamp level) in the concavity. There is thereby formed in the workpiece a concavity of a uniform depth equal to the abovesaid clamp level.

With the above clamped tracer control system, however, each time the clamp level is increased, the already machined upper portion of the inner wall of the workpiece is machined (that is, the cutter is brought into contact with that portion), presenting problems of not only involving a waste of the cutting time but also shortening the service life of the cutter owing to its repeated rubbing against the already machined inner wall of the workpiece.

SUMMARY OF THE INVENTION

An object of the present invention is to provide a tracer control system which reduces waste of the cutting time and wear of the cutter.

The present invention is so arranged as to perform the steps of (a) clamping the tip of the tracer head at a Z-axis position of a predetermined depth in a concavity of the model, (b) effecting contour tracing along the entire circumference of the inner wall of the concavity of the model in the said clamped state and, while doing so, storing the coordinates of maximal and minimal points where the X or Y coordinate of the tip of the tracer head is maximal and minimal on the contour tracing path, (c) feeding the tracer head to a point inside of the nearest one of the maximal and minimal points in the clamped state after completion of the contour tracing, (d) effecting X-Y plane tracing relative to the inner wall of the concavity of the model from the abovesaid point to the minimal point or maximal point on the opposite side of the concavity while retaining the tip of the tracer head in the clamped state, and (e) further lowering the tip of the tracer head along the inner wall of the concavity of the model from the X-Y plane tracing end position and clamping the tip of the tracer head at a new Z-axis position of a predetermined depth, and thereafter repeating the operations (b) to (e) in the newly clamped state until the tip of the tracer head reaches a predetermined depth.

BRIEF DESCRIPTION OF THE DRAWINGS

FIGS. 3 and 4 are flowcharts explanatory of its control method.

DESCRIPTION OF PREFERRED EMBODIMENTS

Figure 1:
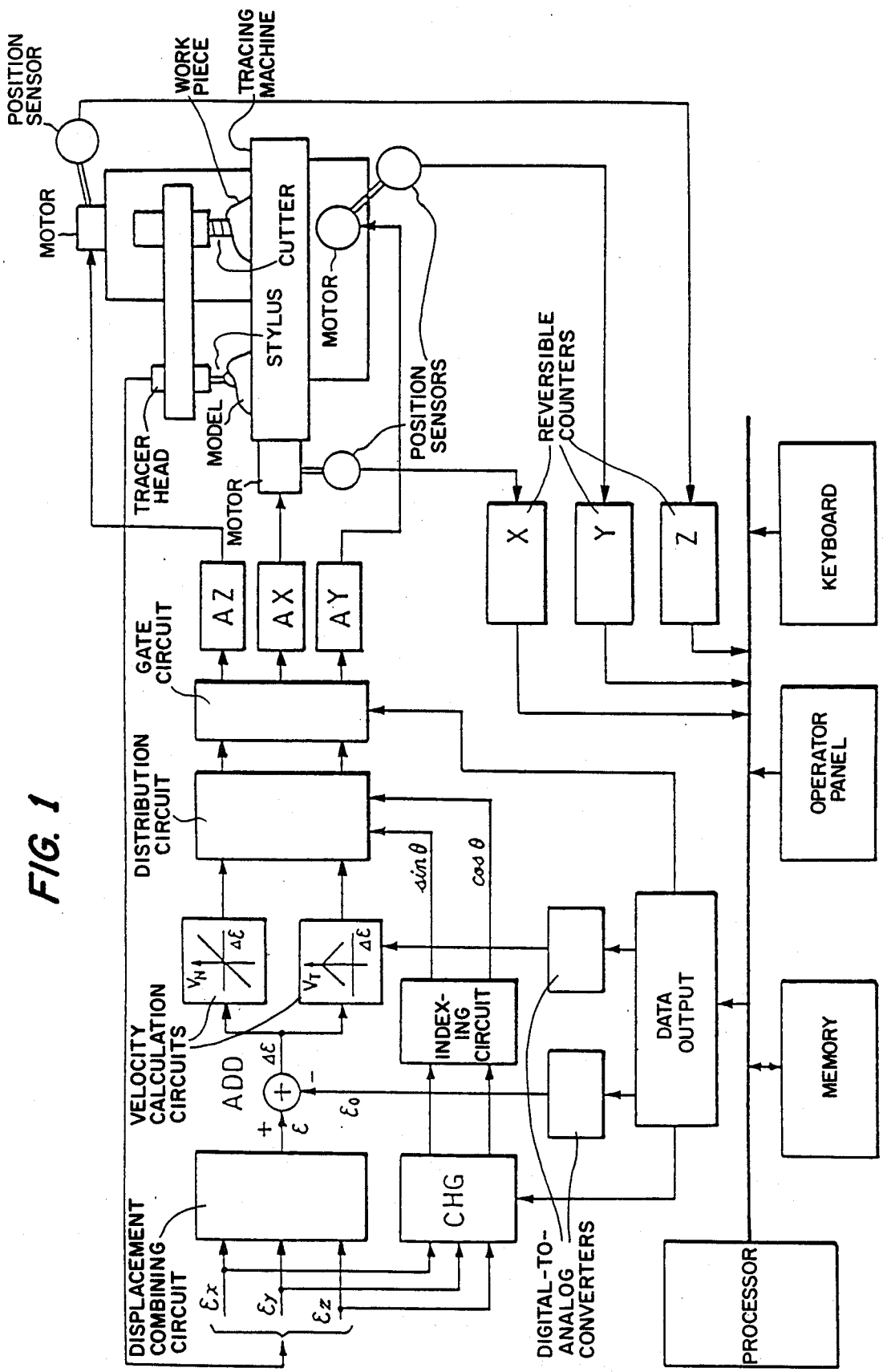
FIG. 1 is a block diagram illustrating an embodiment of the present invention.

FIG. 1 is a block diagram illustrating an embodiment of the present invention. Reference character MAC indicates a tracing machine, MDL a model, W a workpiece, ST a stylus for contact with the surface of the model MDL, TR a tracer head for yielding displacement signals $\epsilon_x$, $\epsilon_y$ and $\epsilon_z$ corresponding to displacement of the stylus ST, CT a cutter for cutting the workpiece W, MX, MY and MZ X-, Y- and Z-axis motors, PCX, PCY and PCZ position sensors respectively coupled with the motors MX, MY and MZ for detecting the machine position, such as resolvers, pulse coders or the like, DG a displacement combining circuit for combining the displacement signals $\epsilon_x$, $\epsilon_y$ and $\epsilon_z$ into a composite signal $\epsilon = \sqrt{\epsilon_x^2 + \epsilon_y^2 + \epsilon_z^2}$, CHG a change-over circuit for selectively changing over the displacement signals, IND an indexing circuit for deriving displacement direction signals $\sin\theta$ and $\cos\theta$ from the displacement signals, ADD an adder for obtaining a difference signal $\Delta\epsilon = \epsilon - \epsilon_0$ between the composite displacement signal $\epsilon$ and a reference displacement signal $\epsilon_0$, ARN and ART velocity calculation circuits for deriving normal velocity signal $V_N$ and tangential velocity signal $V_T$ from the difference signal $\Delta\epsilon$, DC a distribution circuit for generating a velocity command signal on the basis of the normal velocity signal $V_N$, the tangential velocity signal $V_T$ and the displacement direction signals $\sin\theta$ and $\cos\theta$, GC a gate circuit for making operable the X-, Y- and Z-axis motors MX, MY and MZ which are specified on the basis of the velocity command signal, AX, AY and AZ drive circuits for supplying power to the motors MX, MY and MZ to drive them, CNTX, CNTY and CNTZ reversible counters for reversibly counting pulses from the position sensors PCX, PCY and PCZ to indicate the current position of the movable machine part, CPU a processor for effecting control of respective parts and calculations therefor, DO a data output device for outputting control data from the processor CPU to the respective parts, MEM a memory for storing a control program and various data, OPP an operator panel for entering data on the start of cutting, the cutting speed and so forth, KB a keyboard for entering various data, and DA1 and DA2 digital-to-analog converters.

The tracer head TR and the cutter CT are fed as one body and feed rate components in the respective axes are calculated using the displacement signals $\epsilon_x$, $\epsilon_y$ and $\epsilon_z$ corresponding to the displacement of the stylus ST in contact with the model MDL, on the basis of which copy-cutting of the workpiece W is carried out. Since such a copy-cutting operation is already well known, no detailed description will be given thereof.

Figure 2:
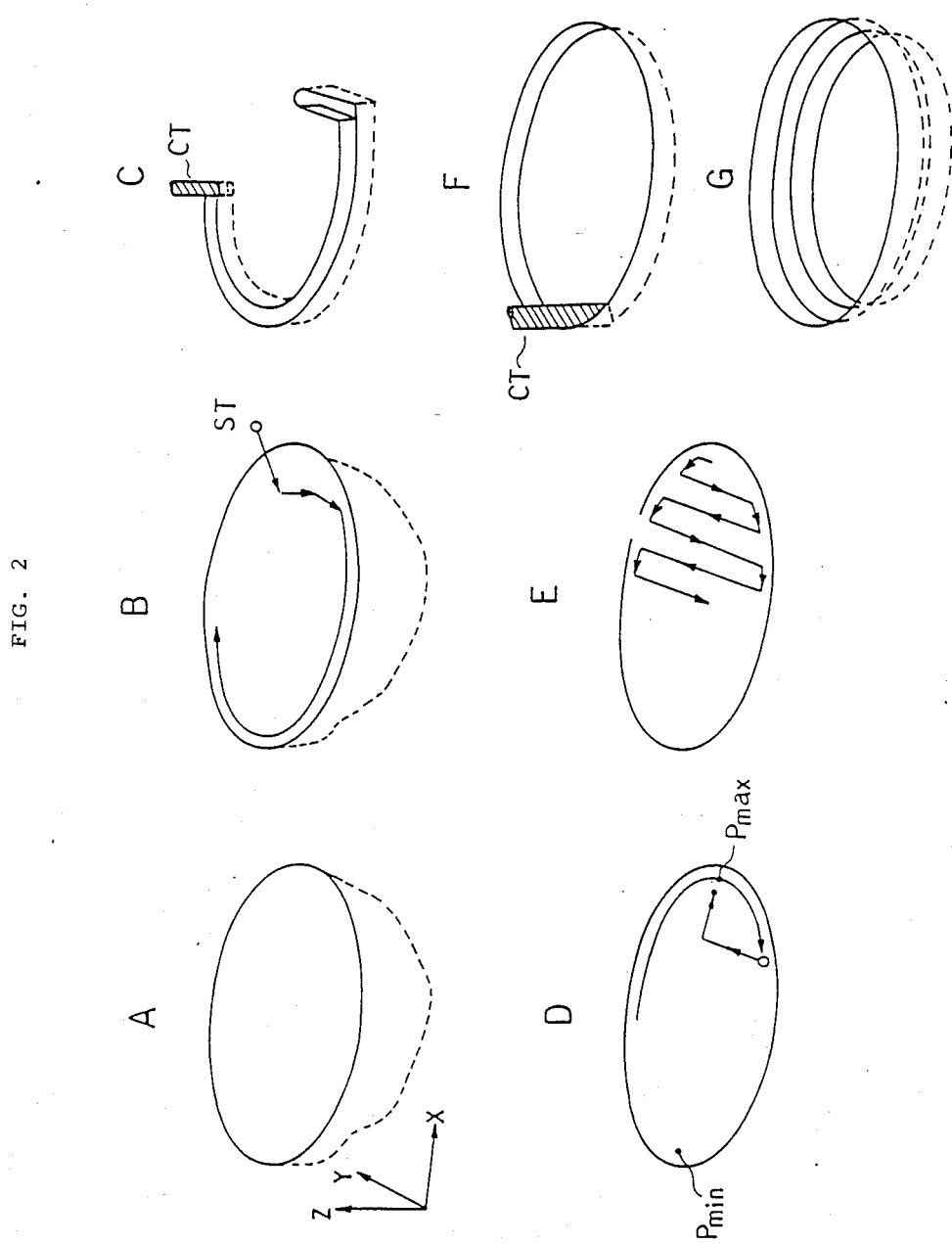
FIG. 2 (including Parts A to G) is a series of schematic diagrams showing the configurations of a model and a workpiece and the positional relationships thereof to a stylus and a cutter in the embodiment of the present invention.
Figure 3:
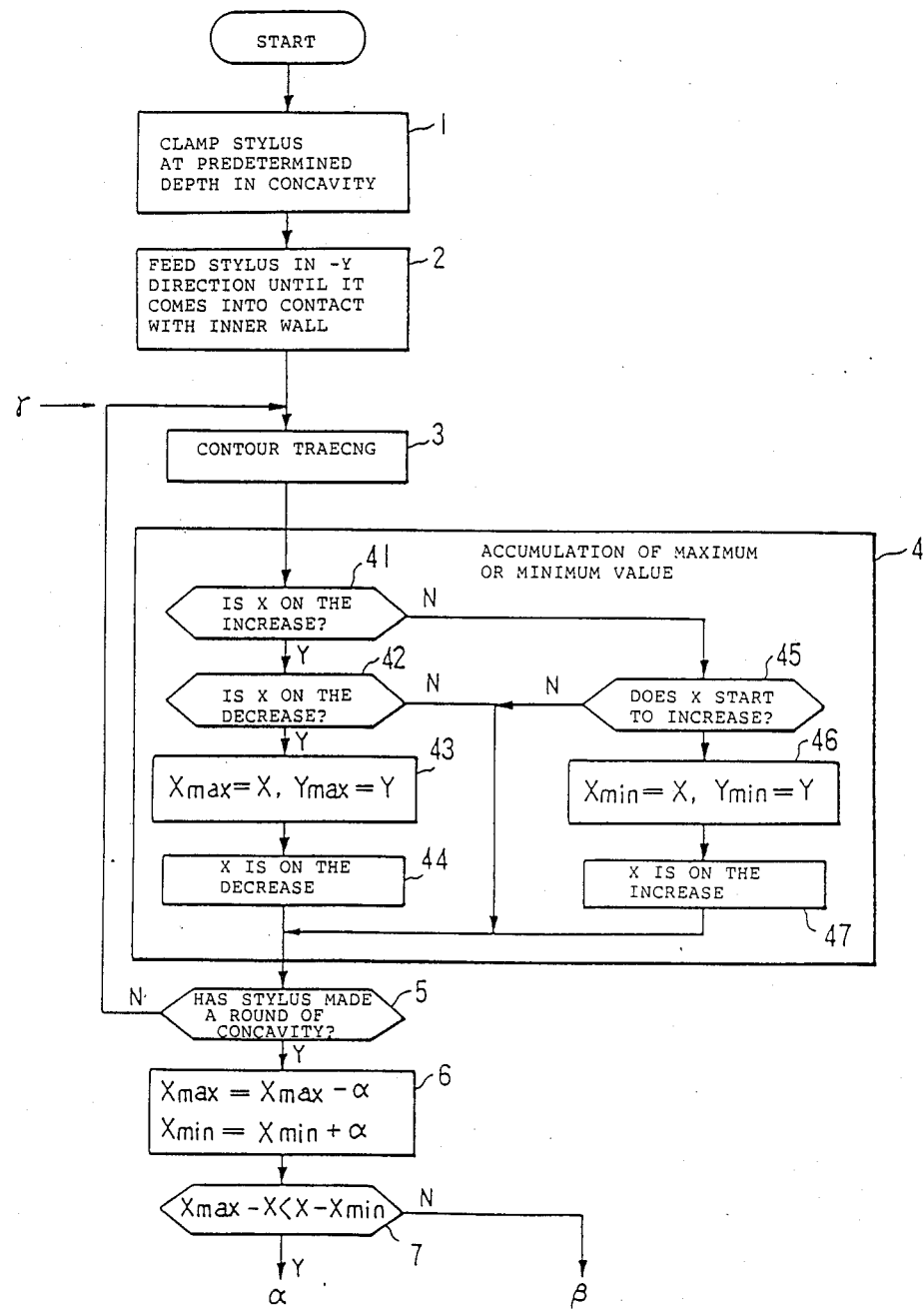

FIG. 2 (including Parts A to G) is a series of schematic drawings showing the configurations of a model and a workpiece and the positional relationships thereto of the stylus ST and the cutter CT in an embodiment of the present invention, and FIGS. 3 and 4 are flowcharts for explaining its control method. With reference to these drawings, an embodiment of the present invention will hereinafter be described.

Consider such a model configuration as shown in FIG. 2 at A which has a dish-like concavity in a flat plate, and consider three orthogonal axes as shown.

When starting its control operation, the processor CPU of the tracer control system moves the tracer head TR (represented by the stylus ST mounted on the tip thereof) to an appropriate position above the concavity of the model, lowers it and then clamps (or fixes the height of) the stylus at a position of a predetermined depth in the concavity, as shown in in FIG. 2 at B and in step 1 of FIG. 3. After this, the stylus ST is fed in the −Y direction until it comes into contact with the inner wall of the concavity of the model in step 2. After the stylus has thus been brought into contact with the inner wall of the concavity, contour tracing of the inner wall takes place in the counterclockwise direction while retaining the stylus in the clamped state in step 3. In FIG. 2 the solid lines with arrows indicate the paths of movement of the center of the stylus. By steps 1 to 3 described above, such a cutting locus as shown in FIG. 2 at C is drawn on the workpiece.

In parallel with the abovesaid contour tracing, the processor CPU detects maximum and minimum values of the X coordinate of the stylus in the contour by the counter CNTX and stores these values in step 4. That is, in step 41, a check is made of the contents of a flag which is set to go to a "1" when the coordinate position of the stylus in the X direction begins to increase and to a "0" when that coordinate position begins to decrease. When the X coordinate is on the increase, it is checked in step 42 whether the X coordinate has started to decrease at the current point of time. If the result of this checking is affirmative, the X coordinate at the current point of time (precisely speaking, the X coordinate in the immediately preceding cycle) will be stored as a maximum value Xmax of the X coordinate in a data memory part of the memory MEM. At the same time, the Y coordinate corresponding to this X coordinate is also stored as a maximum value Ymax of the Y coordinate, On the other hand, when the X coordinate is on the decrease, it is decided in step 45 whether the X coordinate has started to increase at the current point of time, If the result of this decision is affirmative, then the X coordinate at the current point of time (precisely speaking, the X coordinate in the immediately preceding cycle) will be stored as a minimum value Xmin of the X coordinate in the data memory part. At the same time, the Y coordinate corresponding to this X coordinate is also stored as a minimum value Ymin of the Y coordinate, When the maximum or minimum value has been stored as described above, the contents of the flag are inverted in steps 44 and 47 so as to indicate that the X coordinate is on the decrease or on increase.

The contour tracing and the storage of the maximum and minimum values of the X coordinate described above are repeated until it is decided in step 5 that the stylus ST has made a round of the concavity of the model along its inner wall. After the stylus has made a round of the concavity, the maximum and minimum values Xmax and Xmin of the X coordinate are respectively decreased and increased by a predetermined value α in step 6. Next, it is decided in step 7 which of the maximum and minimum values Xmax and Xmin of the X coordinate is nearer to the current position (the X coordinate) of the stylus.

When the current position is nearer to the maximum value Xmax than to the minimum one, the stylus is fed, still held in the clamped state, to a point spaced by the predetermined value α from a maximum point Pmax of the X coordinate on the inside thereof, as shown in FIG. 2 at D and in steps 8 and 9 of FIG. 4. On the other hand, when the current position is closer to the minimum value Xmin than to the maximum one, the stylus is fed, still held in the clamped state, to a point spaced the predetermined value α from a minimum point Pmin of the X coordinate on the inside thereof, as shown in steps 18 and 19 of FIG. 4.

Assuming that the stylus has been fed toward the maximum point Pmax as shown in FIG. 2 at D, X-Y plane tracing by a series of steps 10 to 17 in FIG. 4 will be carried out, as shown in FIG. 2 at E. That is, the following operations are repeated. At first, the stylus ST is fed in the +Y direction until it will come into contact with the inner wall of the concavity of the model (step 10); after the stylus has been brought into contact with the inner wall of the concavity, contour tracing is performed by a predetermined amount in the counterclockwise direction (step 11); after the contour tracing, the stylus is fed in the −Y direction until it will come into contact with the inner wall of the concavity on the opposite side thereof (step 14); after the stylus has thus been brought into contact with the inner wall of the concavity, contour tracing is carried out by a predetermined amount in the clockwise direction (step 15); and then the stylus is fed again in the +Y direction. The X-Y plane tracing in the clamped state in steps 10 to 17 is repeated until it is decided in step 12 or 16 that the stylus has been moved to the point spaced the predetermined value α from the minimum point Pmin on the inside thereof.

Since the height of the stylus is always fixed (clamped) until the stylus has been brought to the inside of the minimum point Pmin by the X-Y plane tracing after the contour tracing was started in step 3, there will have been formed in the surface of the workpiece such a concavity of a uniform depth as shown in FIG. 2 at F when the stylus arrives at the abovesaid point. In this case, since the X-Y plane tracing takes place from the maximum to the minimum point, the tracing will not overlap at any place and cover the required entire area of the concavity.

Also in the case where the process proceeds from step 7 to step 18, operations from steps 18 to 27 respectively corresponding to the operations of steps 8 to 17 already described are performed. In this case, however, the X-Y plane tracing is effected in the direction from the minimum point Pmin to the maximum point Pmax.

When the stylus has thus arrived at the inside of the minimum or maximum point Pmin or Pmax, a flag is checked in step 28 which indicates whether the X-Y plane tracing just completed is final or not. If not, the process proceeds to a series of control steps 29 to 31, in which the stylus is released from the clamped state and it is fed by a predetermined amount in the −Z direction by X-Z tracing, that is, while tracing the inner wall of the concavity of the model in the X-Z plane. When it is decided in step 30 in the −Z direction feed loop that the height (z) of the stylus has reached a cutting end position, i.e. that the stylus has come into contact with the bottom of the concavity of the model, or that the height of the stylus has reached a predetermined value prestored as data, the amount of feed is clamped to this value. Further, after a flag indicating that the next X-Y plane tracing is final is set in step 32, the process proceeds to the aforementioned step 3, from which the same X-Y plane tracing as described above is repeated using the increased clamp value.

When the stylus does not come into contact with the bottom of the model until a new clamp value is reached, the process goes back to step 3 from steps 30 and 31 and the X-Y plane tracing is repeated using the new clamp value, forming in the surface of the workpiece such a new concavity of a uniform depth as shown in FIG. 2 at G. Finally, it is detected in step 28 that the X-Y plane tracing having just finished in step 12, 16, 22 or 26 is final, and the entire operation is completed in step 33.

The intervals of the amounts of clamp in the depthwise direction in the above operations need only to be set to suitable values in accordance with the slope of the inner wall surface of the concavity of the model, required tracing accuracy and so forth, and accordingly, the intervals of the amounts of clamp may differ from each X-Y plane tracing.

While in the above the X-Y plane tracing has been described to be carried out by a combination of contour tracing of a predetermined amount with feeds in the Y and the −Y directions, it is a matter of course that the above tracing may also be effected by a combination of contour tracing of a predetermined amount with X and −X direction feeds.

As described above in detail, the present invention is designed to perform contour tracing and X-Y plane tracing over the entire circumference of a concavity of a model at each clamp level which is gradually increased, and hence the invention eliminates the possibility that the upper portion of the inner wall already formed in the workpiece is repeatedly cut at the respective clamp levels as in the prior art example, ensuring reducing wasted cutting time and wear of the cutter.

I claim:

1. A tracer control method which calculates a tracing direction and a tracing velocity on the basis of displacement signals from a tracer head and controls tracing of a concavity of a model, comprising the steps of:
   (a) clamping the tip of the tracer head at a Z-axis position of a predetermined depth in the concavity of the model;
   (b) performing contour tracing along the entire circumference of the inner wall of the concavity of the model while holding the tip of the tracer head in the clamped state and, while doing so, storing the coordinates of maximum and minimum points where a predetermined one of the X and Y coordinates of the tip of the tracer head has its maximum and minimum values on the contour tracing path;
   (c) feeding the tracer head to a point inside one of the maximum and minimum points while maintaining it in the clamped state after completion of the contour tracing;
   (d) effecting X-Y plane tracing relative to the inner wall of the concavity of the model from the abovesaid point to the other one of the minimum or maximum points of the concavity while retaining the tip of the tracer head in the clamped state; and
   (e) further lowering the tip of the tracer head along the inner wall of the concavity of the model from the end position of the X-Y plane tracing and clamping it at a new Z-axis position of a predetermined deeper depth;
   wherein the steps (b) to (e) are repeated in the newly clamped state until the tip of the tracer head reaches a further predetermined depth.

2. The method of claim 1, comprising performing said feeding to a point inside the nearest one of said maximum and minimum points.

* * * * *

UNITED STATES PATENT AND TRADEMARK OFFICE
CERTIFICATE OF CORRECTION

PATENT NO. : 4,688,179

DATED : Aug. 18, 1987

INVENTOR(S) : E. Yamazaki

It is certified that error appears in the above-identified patent and that said Letters Patent is hereby corrected as shown below:

Title page:

[73] "Yamanashi" should be --Minamitsuru--.

COL. 3

Line 50, "," should be --.--;
    Line 53, "," should be --.--; (1st occurrence)
    Line 60, "," should be --.--.

Signed and Sealed this

Twenty-second Day of March, 1988

Attest:

DONALD J. QUIGG

*Attesting Officer*     *Commissioner of Patents and Trademarks*